US012675490B2

(12) United States Patent
Martigny et al.

(10) Patent No.: US 12,675,490 B2
(45) Date of Patent: *Jul. 7, 2026

(54) MULTIMODAL ANALYSIS FOR CONTENT ITEM SEMANTIC RETRIEVAL AND IDENTIFICATION

(71) Applicant: ROKU, INC., San Jose, CA (US)

(72) Inventors: Peter Martigny, San Francisco, CA (US); Fedor Bartosh, San Jose, CA (US); Danish Shaikh, Dale City, CA (US); Vinh Nguyen, San Jose, CA (US); Manasi Deshmukh, San Jose, CA (US); Ratul Ray, Santa Clara, CA (US); Nitish Aggarwal, Sunnyvale, CA (US); Srimaruti Manoj Nimmagadda, Saratoga, CA (US); Kapil Kumar, London (GB); Sameer Girolkar, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,887

(22) Filed: Oct. 10, 2024

(65) Prior Publication Data

US 2025/0036638 A1    Jan. 30, 2025

Related U.S. Application Data

(63) Continuation of application No. 18/167,724, filed on Feb. 10, 2023, now Pat. No. 12,153,588.

(51) Int. Cl.
| | |
|---|---|
| *G06F 16/2457* | (2019.01) |
| *G06F 16/242* | (2019.01) |
| *G06F 16/9535* | (2019.01) |

(52) U.S. Cl.
CPC ...... *G06F 16/24578* (2019.01); *G06F 16/243* (2019.01); *G06F 16/9535* (2019.01)

(58) Field of Classification Search
CPC ............ G06F 16/24578; G06F 16/243; G06F 16/9535
See application file for complete search history.

(56) References Cited

U.S. PATENT DOCUMENTS

| | | | | |
|---|---|---|---|---|
| 2013/0254140 A1* | 9/2013 | Li | .......................... | G06F 16/9535 |
| | | | | 706/12 |
| 2019/0347282 A1* | 11/2019 | Cai | .......................... | G06N 5/022 |

(Continued)

*Primary Examiner* — Courtney Harmon
(74) *Attorney, Agent, or Firm* — STERNE, KESSLER, GOLDSTEIN & FOX P.L.L.C.

(57) ABSTRACT

A content retrieval system may receive a query associated with a plurality of content items in a repository. For each content item of the plurality of content items: a respective first and second similarity score may be generated based on a similarity between embeddings indicative of a first and second data type generated from the query and for the content item; and a respective normalized similarity score may be generated based on a combination of the respective first and second similarity scores. A set of content items with respective normalized similarity scores that satisfy a similarity score threshold may be identified. An exact-match (lexical) search may yield respective mapping scores for content items that may also be ranked. An output indicative of content items that are identified in the set of content items with high-ranking similarity scores and identified in the set of content items with high-ranking mapping scores.

12 Claims, 7 Drawing Sheets

(56)　　　　　　　References Cited

U.S. PATENT DOCUMENTS

| 2023/0093756 A1 * | 3/2023 | Banerjee | G06Q 30/0633 |
| | | | 705/26.7 |
| 2023/0146336 A1 * | 5/2023 | Wang | G06N 3/045 |
| | | | 705/26.1 |
| 2023/0260164 A1 * | 8/2023 | Yuan | G06N 3/0895 |
| | | | 382/157 |
| 2023/0315768 A1 | 10/2023 | Cainey et al. | |
| 2023/0315792 A1 | 10/2023 | Zhang et al. | |
| 2024/0273105 A1 | 8/2024 | Martigny et al. | |
| 2025/0217446 A1 * | 7/2025 | Xu | G06F 18/22 |

* cited by examiner

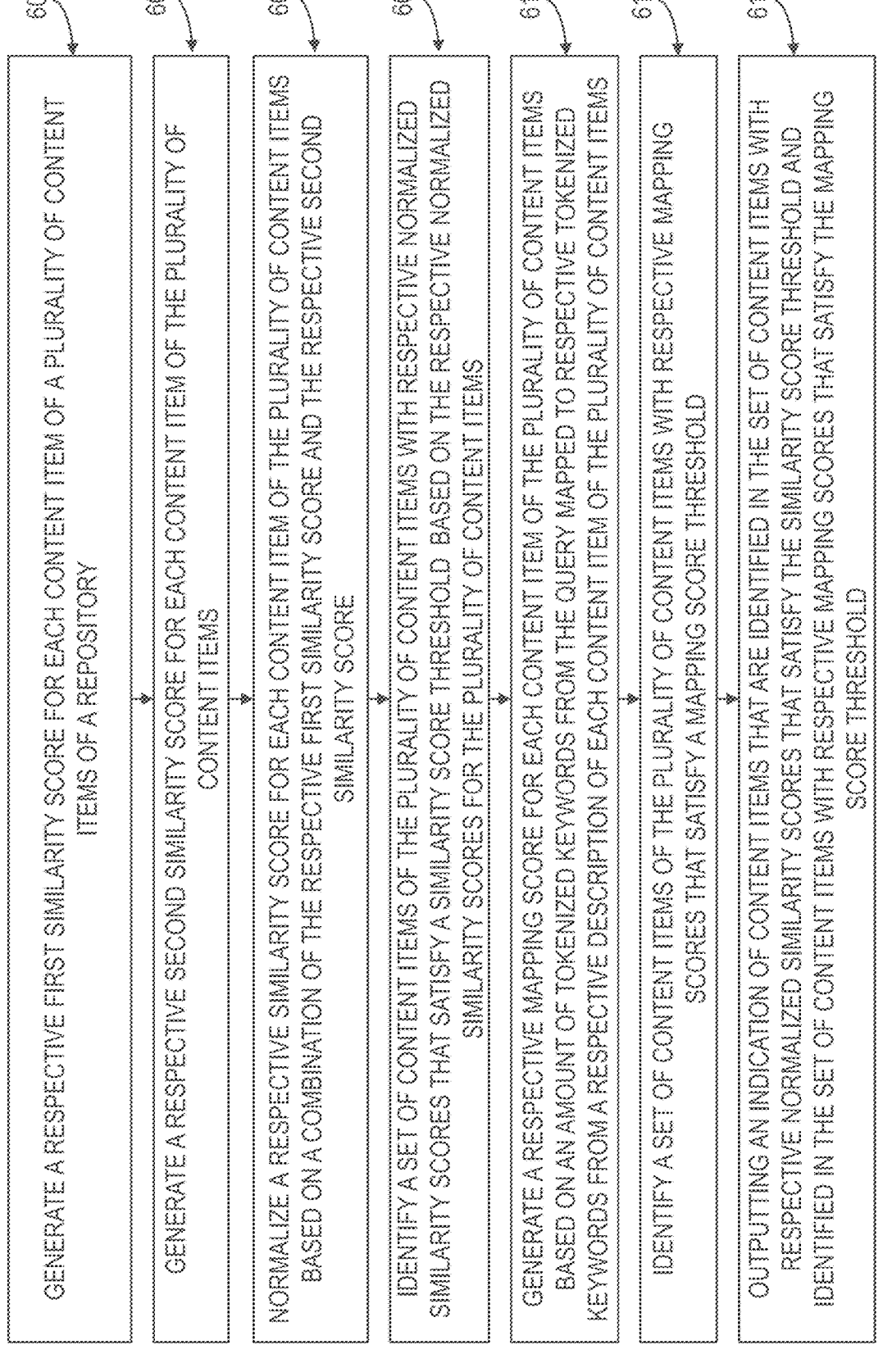

600

602 — GENERATE A RESPECTIVE FIRST SIMILARITY SCORE FOR EACH CONTENT ITEM OF A PLURALITY OF CONTENT ITEMS OF A REPOSITORY

604 — GENERATE A RESPECTIVE SECOND SIMILARITY SCORE FOR EACH CONTENT ITEM OF THE PLURALITY OF CONTENT ITEMS

606 — NORMALIZE A RESPECTIVE SIMILARITY SCORE FOR EACH CONTENT ITEM OF THE PLURALITY OF CONTENT ITEMS BASED ON A COMBINATION OF THE RESPECTIVE FIRST SIMILARITY SCORE AND THE RESPECTIVE SECOND SIMILARITY SCORE

608 — IDENTIFY A SET OF CONTENT ITEMS OF THE PLURALITY OF CONTENT ITEMS WITH RESPECTIVE NORMALIZED SIMILARITY SCORES THAT SATISFY A SIMILARITY SCORE THRESHOLD BASED ON THE RESPECTIVE NORMALIZED SIMILARITY SCORES FOR THE PLURALITY OF CONTENT ITEMS

610 — GENERATE A RESPECTIVE MAPPING SCORE FOR EACH CONTENT ITEM OF THE PLURALITY OF CONTENT ITEMS BASED ON AN AMOUNT OF TOKENIZED KEYWORDS FROM THE QUERY MAPPED TO RESPECTIVE TOKENIZED KEYWORDS FROM A RESPECTIVE DESCRIPTION OF EACH CONTENT ITEM OF THE PLURALITY OF CONTENT ITEMS

612 — IDENTIFY A SET OF CONTENT ITEMS OF THE PLURALITY OF CONTENT ITEMS WITH RESPECTIVE MAPPING SCORES THAT SATISFY A MAPPING SCORE THRESHOLD

614 — OUTPUTTING AN INDICATION OF CONTENT ITEMS THAT ARE IDENTIFIED IN THE SET OF CONTENT ITEMS WITH RESPECTIVE NORMALIZED SIMILARITY SCORES THAT SATISFY THE SIMILARITY SCORE THRESHOLD AND IDENTIFIED IN THE SET OF CONTENT ITEMS WITH RESPECTIVE MAPPING SCORES THAT SATISFY THE MAPPING SCORE THRESHOLD

FIG. 6

MULTIMODAL ANALYSIS FOR CONTENT ITEM SEMANTIC RETRIEVAL AND IDENTIFICATION

CROSS-REFERENCE TO RELATED APPLICATIONS

This application is a continuation of U.S. patent application Ser. No. 18/167,724, filed Feb. 10, 2023 titled "Multimodal analysis for content item semantic retrieval and identification", which is incorporated herein in its entirety.

BACKGROUND

Field

This disclosure is generally directed to multimodal analysis for content item semantic retrieval and identification, and more particularly to optimized retrieval of content items responsive to a query.

Background

Content and content item retrieval systems commonly use exact match similarity measures or other statistical methods to identify content or content items relevant to a query. Quality results for the query are readily obtained when search queries are narrow and a query is for a specific target (e.g., a query is for a specific movie title, series, sports game, etc.). However, exact match similarity measures and other statistical methods underperform when queries for content items are ambiguous. For example, exact match similarity measures and other statistical methods underperform when users attempt to browse content in an entity catalog or searchable system by giving vague ideas of desired content, such as ambiguous queries for content categories. The ineffectiveness of exact match similarity measures and other statistical methods to produce quality results to an ambiguous query for content categories is prominent in scenarios when an entity catalog or searchable system does not include the content category queried.

SUMMARY

Provided herein are system, apparatus, article of manufacture, method and/or computer program product embodiments, and/or combinations and sub-combinations thereof, for multimodal analysis for content item semantic retrieval and identification. A content retrieval system may receive a query associated with a plurality of content items in a repository. For each content item of the plurality of content items, a respective first similarity score may be generated based on a similarity between an embedding indicative of a first data type generated from the query and an embedding indicative of the first data type generated for the content item, and respective second similarity score may be generated based on a similarity between an embedding indicative of a second data type generated from the query and an embedding indicative of the second data type generated for the content item. For each content item of the plurality of content items, the respective first and second similarity scores may be normalized to a respective normalized similarity score. A set of content items with respective normalized similarity scores that satisfy a similarity score threshold may be identified. Based on the amount of tokenized keywords from the query mapped to respective tokenized keywords from a respective description of each content item of the plurality of content items, a respective mapping score; may be generated and ranked according to a mapping score threshold. An output of the content retrieval system responsive to the query may indicate content items that are identified in the set of content items with respective normalized similarity scores that satisfy the similarity score threshold and identified in the set of content items with respective mapping scores that satisfy the mapping score threshold.

BRIEF DESCRIPTION OF THE FIGURES

The accompanying drawings are incorporated herein and form a part of the specification.

FIG. 6 illustrates a flowchart of an example method for multimodal analysis for content item semantic retrieval and identification, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
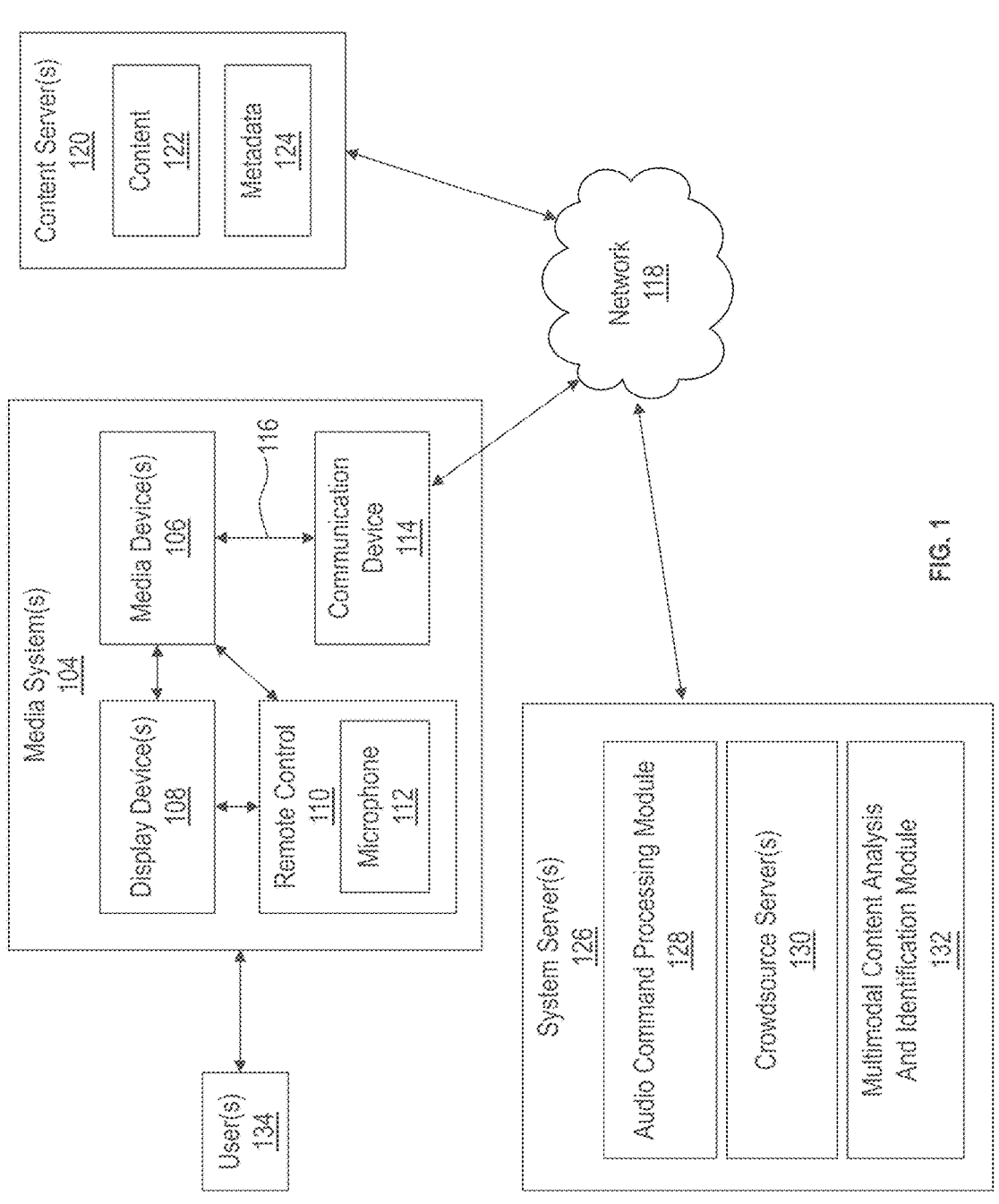
FIG. 1 illustrates a block diagram of a multimedia environment, according to some aspects of this disclosure.

Provided herein are system, apparatus, device, method and/or computer program product embodiments, and/or combinations and sub-combinations thereof, for multimodal analysis for content item semantic retrieval and identification. As used in the specification and the appended claims, "content items" may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether the format is presently known or developed in the future. Content items may be any combination of the above-described formats.

According to some aspects of this disclosure, a content retrieval system, which may be implemented on one or more computing devices, is configured to intelligently manage unstructured content-related data to indicate the most relevant content items responsive to a query. According to some aspects of this disclosure, the content retrieval system is trained to infer semantics and relevancy from different modalities of data (e.g., textual data, image data, audio data, etc.) associated with the content items to provide an indication of the most relevant content items responsive to a query. According to some aspects of this disclosure, the content retrieval system may also use exact match similarity measures and/or other statistical methods to optimize the relevancy of content items identified responsive to a query.

For example, according to some aspects of this disclosure, the content retrieval system may infer from image data (e.g., an image, video, graphical depictions, etc.), textual data (e.g., content descriptive data, closed captioning data, audio description data, etc.), audio data (e.g., voice/audio tracks, soundtracks, sound effects, etc.), ancillary content item data (e.g., information indicating or related to writer, director, producer, composer, artist, actor, summary, chapters, production, history, year, trailers, alternate versions, etc.), or the like whether a movie, show, program, or the like will be about a specific topic (e.g., racing cars, sharks, dinosaurs, aliens, British wizards, etc.) or belong to a particular category (e.g., children shows, mature content, etc.), and decide when best to provide indication of the movie, show, program, and/or the like responsive to a query. For example, responsive to a query for "dinosaur movies," the content retrieval system may identify salient semantic information from an image, a title, and/or a description of the film "Jurassic Park" to provide an indication of the film, even if the term/concept "dinosaur" is not included in a list of categories of content items managed by the content retrieval system. According to some aspects of this disclosure, the content retrieval system may perform concurrent semantic retrieval of content items according to any modality of data and may normalize similarity scores generated for any embedding space to enable optimized ranking of identified content items. These and other technological advantages are described herein.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

According to some aspects of this disclosure, multimedia environment 102 may include one or more media systems 104. According to some aspects of this disclosure, media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. According to some aspects of this disclosure, user(s) 134 may operate with the media system 104 to query, select, and/or consume content items.

According to some aspects of this disclosure, each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

According to some aspects of this disclosure, the media device 106 may be a streaming media device, DVD or BLU-RAY device, audio/video playback device, cable box, and/or digital video recording device, to name just a few examples. Display device 108 may be a monitor, television (TV), computer, mobile device, smart device, tablet, wearable (such as a watch or glasses), appliance, internet of things (IoT) device, and/or projector, to name just a few examples. According to some aspects of this disclosure, media device 106 can be a part of, integrated with, operatively coupled to, and/or connected to its respective display device 108.

Figure 2:
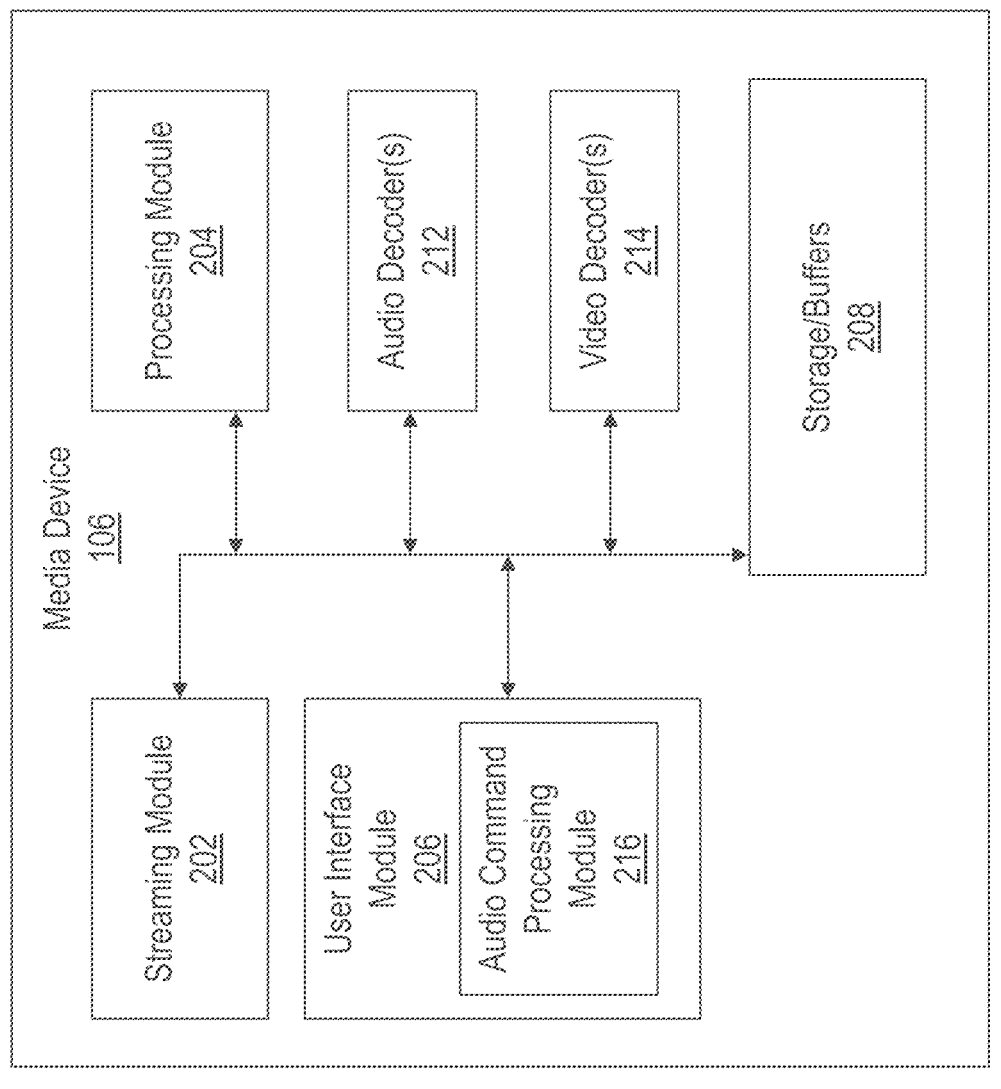
FIG. 2 illustrates a block diagram of a streaming media device, according to some aspects of this disclosure.

FIG. 2 illustrates a block diagram 200 of an example media device 106, according to some embodiments. Media device 106 may include a streaming module 202, processing module 204, storage/buffers 208, and user interface module 206. The user interface module 206 may include an audio command processing module 216.

According to some aspects of this disclosure, the media device 106 may include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

According to some aspects of this disclosure, network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

According to some aspects of this disclosure, media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

According to some aspects of this disclosure, multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

According to some aspects of this disclosure, each content server 120 may store content 122 and metadata 124. According to some aspects of this disclosure, content 122 may include advertisements, promotional content, commercials, and/or any advertisement-related content. According to some aspects of this disclosure, content 122 may include any combination of advertising supporting content including, but not limited to, content items (e.g. movies, episodic serials, documentaries, content, etc.), music, videos, movies, TV programs, multimedia, images, still pictures, text, graphics, gaming applications, ad campaigns, programming content, public service content, government content, local community content, software, and/or any other content and/or data objects in electronic form.

According to some aspects of this disclosure, metadata 124 comprises data about content 122. For example, metadata 124 may include associated or ancillary information indicating or related to writer, director, producer, composer, artist, actor, summary, chapters, production, history, year, trailers, alternate versions, related content, applications, objects depicted in content items, object types, closed captioning data/information, audio description data/information, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

According to some aspects of this disclosure, multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126.

According to some aspects of this disclosure, system server(s) 126 may include an audio command processing module 128. As noted above, the remote control 110 may include a microphone 112. The microphone 112 may receive audio data from users 134 (as well as other sources, such as the display device 108). According to some aspects of this disclosure, the media device 106 may be audio responsive, and the audio data may represent verbal commands from the user 134 to control the media device 106 as well as other components in the media system 104, such as the display device 108.

According to some aspects of this disclosure, the audio data received by the microphone 112 in the remote control 110 is transferred to the media device 106, which is then forwarded to the audio command processing module 128 in the system server(s) 126. The audio command processing module 128 may operate to process and analyze the received audio data to recognize the user 134's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 128 in the system server(s) 126, or the verbal command recognized by the audio command processing module 216 in the media device 106).

Now referring to both FIGS. 1 and 2, in some embodiments, the user 134 may interact with the media device 106 via, for example, the remote control 110. For example, user 134 may use the remote control 110 to interact with the user interface module 206 of the media device 106 to query/search and/or select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 134.

According to some aspects of this disclosure, the media system 104 may include devices and/or components supporting and/or facilitating linear television, inter-device/component communications (e.g., HDMI inputs connected to gaming devices, etc.), online communications (e.g., Internet browsing, etc.) and/or the like.

According to some aspects of this disclosure, for example, in streaming embodiments, the streaming module 202 may transmit the content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, the media devices 106 may exist in thousands or millions of media systems 104. Accordingly, the media devices 106 may lend themselves to crowdsourcing embodiments and, thus, the system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between closed captioning requests issued by different users 134 watching a content item, advertisement, and/or the like.

Based on such information, the crowdsource server(s) 130 may determine that turning closed captioning on may enhance users' viewing experience at particular portions of the content item, advertisement, and/or the like (for example, when the soundtrack of the content item, advertisement, and/or the like is difficult to hear), and turning closed captioning off may enhance users' viewing experience at other portions of the content item, advertisement, and/or the like (for example, when displaying closed captioning obstructs critical visual aspects of the content item, advertisement, and/or the like). Accordingly, the crowdsource server(s) 130 may operate to cause closed captioning to be automatically turned on and/or off during future streaming of the content item, advertisement, and/or the like.

According to some aspects of this disclosure, using information received from the media devices 106 (and/or user device(s) 103) in the thousands and millions of media systems 104, the crowdsource server(s) 130 may identify media devices (and/or user devices) to target with and/or acquire from bid stream data, communications, information, and/or the like. For example, the most popular content items may be determined based on the amount of content items are requested (e.g., viewed, accessed, etc.) by media devices 106.

According to some aspects of this disclosure, using information received from the media devices 106 in the thousands and millions of media systems 104, the crowdsource server(s) 128 may identify similarities and overlaps between closed captioning requests issued by different users 134 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

According to some aspects of this disclosure, the system server(s) 126 may include a multimodal content analysis and identification module 132. According to some aspects of this disclosure, multimodal content analysis and identification module 132 may use semantic search items to improve user engagement (e.g., click-through rates, launch rates, streaming hours, etc.) with categorical search and/or query results. For example, multimodal content analysis and identification module 132 may use processing techniques, such as artificial intelligence, semantic analysis, lexical analysis, exact-match retrieval, statistical models, logical processing algorithms, and/or the like to indicate the most relevant content items responsive to a query.

According to some aspects of this disclosure, the multimodal content analysis and identification module 132 may use classifiers that map an attribute vector to a confidence that the attribute belongs to a class. For example, the multimodal content analysis and identification module 132 may use classifiers that map vectors that represent attributes of content items either queried/searched for or resident within an entity-owned and/or managed repository. For example, an attribute vector, $x=(x1, x2, x3, x4, xn)$ may be mapped to $f(x)=confidence$ (class).

According to some aspects of this disclosure, identity management and/or bid stream-related activities performed by the multimodal content analysis and identification module 132 may employ a probabilistic and/or statistical-based analysis. According to some aspects of this disclosure, identity management and/or bid stream-related activities performed by the multimodal content analysis and identification module 132 may use any type of directed and/or undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority.

According to some aspects of this disclosure, classifiers, for example, content-related classifiers, content item-related classifiers, semantic classifiers, textual data classifiers, image data classifiers, audio data classifiers, ancillary data classifiers, and/or the like, used by the multimodal content analysis and identification module 132 may be explicitly trained based on labeled datasets relating to various content, content items, semantic information, textual data, image data, audio data, ancillary data, and/or the like. According to some aspects of this disclosure, classifiers, for example, such as content-related classifiers, content item-related classifiers, semantic classifiers, textual data classifiers, image data classifiers, audio data classifiers, ancillary data classifiers, and/or the like, used by the multimodal content analysis and identification module 132 may be implicitly trained (e.g., via results from content retrieval, identification, and/or recommendation task, etc.). For example, the multimodal content analysis and identification module 132 may include support vector machines configured via a learning or training phase within a classifier constructor and feature selection module.

According to some aspects of this disclosure, classifier(s) may be used by the multimodal content analysis and identification module 132 to automatically learn and perform functions, including but not limited to multimodal analysis for content item semantic retrieval and identification and/or the like.

Multimodal Analysis for Content Item Semantic Retrieval and Identification

According to some aspects of this disclosure, system server(s) 126 (e.g. multimodal content analysis and identification module 132, etc.) operate to facilitate multimodal analysis for content item semantic retrieval and identification. According to some aspects of this disclosure, system server(s) 126 may receive a request and/or query, for example, from media 106 and/or the like, for a content item and/or a type of content item. According to some aspects of this disclosure, the receive a request and/or query may include textual data (e.g., typed data, natural language converted to text, etc.), image/graphics data (e.g., an image, an image banner, emoji, emoticons, screenshots, etc.) and/or the like.

According to some aspects of this disclosure, responsive to the request and/or query, multimodal content analysis and identification module 132 may cause independently trained predictive models (e.g., machine learning models, neural networks, etc.) included, configured with, and/or in communication with (and/or the like) the multimodal content analysis and identification module 132 to concurrently run a first vector search on a first data type (e.g., image data for content items, etc.) and a second vector search on second data type (e.g., a text description for content items, etc.) using the request and/or query input as a search parameter. For example, according to some aspects, a first vector search performed by a first predictive model on image data may use an image recognition technique to extract relevant features from the images associated with different content items in the repository (and/or database) and match them with the features in the request and/or query input. According to some aspects of this disclosure, a second vector search performed by a second predictive model on text description data may use natural language processing (NLP) and/or the like to process text descriptions associated with different content items in the repository (and/or database) and match them with the text in the request and/or query input. According to some aspects of this disclosure, multimodal content analysis and identification module 132 may concurrently run any number of vector searches (e.g., a plurality) according to any modalities of data associated with a query and/or content item.

According to some aspects of this disclosure, multimodal content analysis and identification module 132 may normalize similarity scores generated by the first and second predictive models (and/or additional predictive models) that indicate similarity between the request and/or query and content items identified from the searches performed by the predictive models. According to some aspects of this disclosure, multimodal content analysis and identification module 132 may normalize similarity scores generated by the first and second predictive models (and/or additional predictive models) to ensure that the scores are comparable and can be combined in a meaningful manner. According to some aspects of this disclosure, multimodal content analysis and identification module 132 may normalize the similarity scores generated by the first and second predictive models (and/or additional predictive models) by converting the respective similarity scores into standardized scores, such as Z-scores and/or the like, or by transforming them into a common scale.

For example, according to some aspects of this disclosure, multimodal content analysis and identification module 132 may calculate the mean and standard deviation of the list of similarity scores generated by the first predictive model, and calculate the mean and standard deviation of the list of similarity scores generated by the second predictive model. According to some aspects of this disclosure, multimodal content analysis and identification module 132 may assume that both lists of similarity scores follow a normal distribution. According to some aspects of this disclosure, multimodal content analysis and identification module 132 may normalize the similarity scores generated by the first and second predictive models by replacing them with the value of their respective cumulative distribution functions. Despite originating from different embedding spaces, when normalized the similarity scores generated by the first and second predictive models the scores have a probabilistic interpretation. For example, a similarity score of 0.9 generated by either the first or the second predictive models now means that it lies in the 90 percentile of the respective distribution. According to some aspects of this disclosure, multimodal content analysis and identification module 132 may combine normalized scores, for example, by adding them and/or the like.

According to some aspects of this disclosure, if a similarity score for a content item exists in a list of similarity scores generated by one predictive model and not the other, multimodal content analysis and identification module 132 may consider the score of the list it appears in as its final score. According to some aspects of this disclosure, if a similarity score for a content item exists in multiple lists of similarity scores, multimodal content analysis and identification module 132 may calculate an average of the scores average of these two scores as a final score for a content item.

Figure 3:
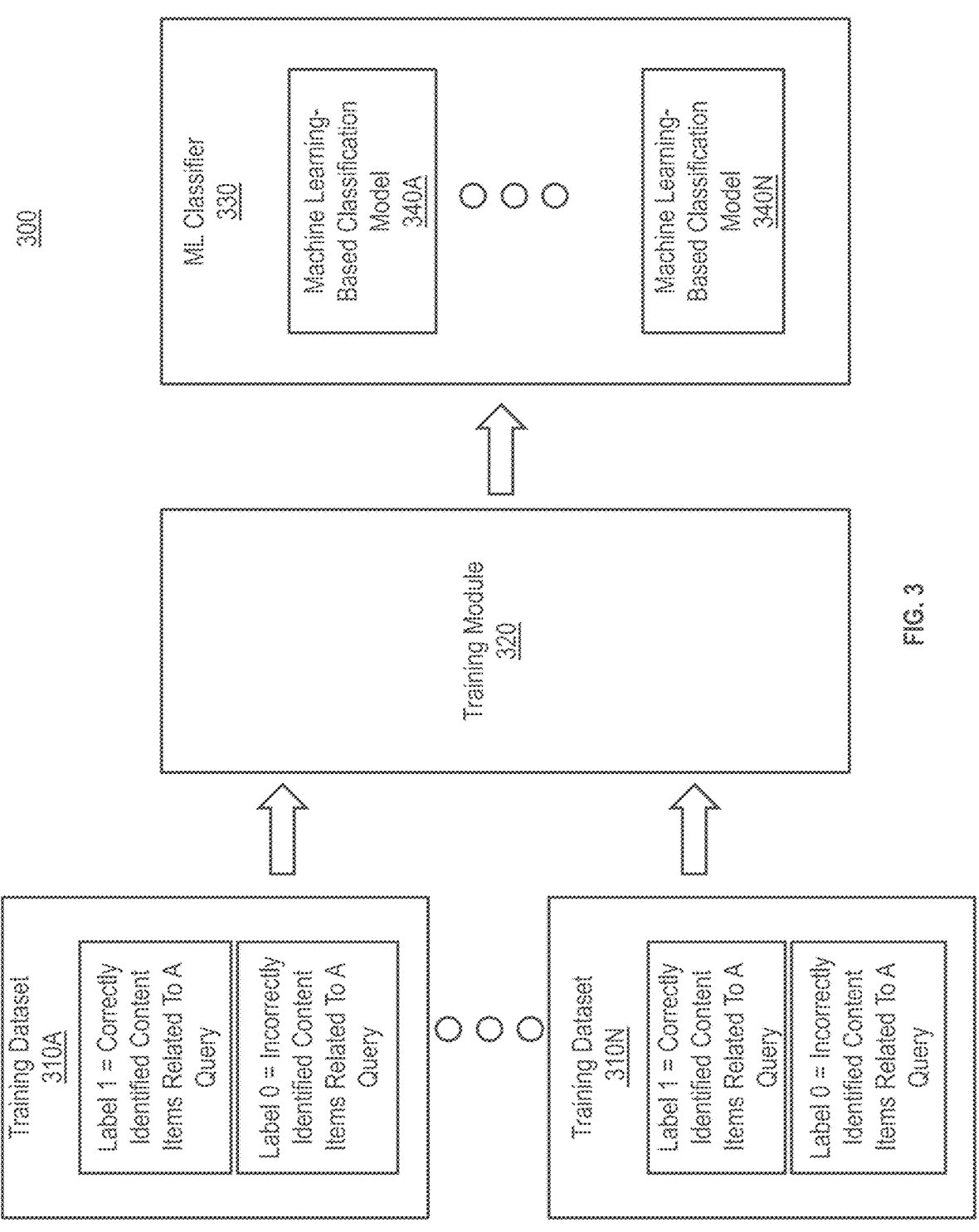
FIG. 3 illustrates an example system for training a module for multimodal analysis for content item semantic retrieval and identification, according to some embodiments.

According to some aspects of this disclosure, to facilitate multimodal analysis for content item semantic retrieval and identification, the multimodal content analysis and identification module 132 may include multiple predictive models that are each trained to determine correspondences and/or similarities between semantic information determined from a request and/or query and semantic information associated with content items. As described herein, the multimodal content analysis and identification module 132 may concurrently engage multiple predictive models to determine correspondences and/or similarities between semantic information multiple modalities of data determined from a request and/or query and semantic information associated with content items. FIG. 3 is an example system 300 for training predictive models of the multimodal content analysis and identification module 132 to determine correspondences and/or similarities between semantic information determined from a request and/or query and semantic information associated with content items. FIG. 3 is described with reference to FIG. 1.

According to some aspects of this disclosure, the system 300 may use machine learning techniques to train one or more machine learning-based classifiers 330 (e.g., a software model, neural network classification layer, etc.). The machine learning-based classifier 330 may be trained by the multimodal content analysis and identification module 132 based on an analysis of one or more training datasets 310A-310N. The machine learning-based classifier 330 may be configured to classify features for a specific modality and/or data type (e.g., textual data, image data, audio data, ancillary content item data, etc.) extracted from requests and/or queries for content and/or content, as well as content items stored and/or available within a repository, catalog, database, via a service, and/or the like.

According to some aspects of this disclosure, the one or more training datasets 310A-310N may comprise labeled baseline data such as labels that indicate textual features (e.g., semantic text similarity, lexical similarities, etc.), image features (e.g., attributes and/or contextual items of image/depictions that indicate similarities in image data, etc.), audio features (e.g., sonic attributes, tones, pitches, vocal patterns, rhythms/beats, etc. that indicate similarities in audio content, etc.), ancillary features, correlations between data types (e.g., text-to-image similarity, etc.), and/or the like. The labeled baseline data may include any number of feature sets. Feature sets may include, but are not limited to, labeled data that identifies extracted features from requests and/or queries for content items, as well as content items available within a repository, catalog, database, via a service, and/or the like.

According to some aspects of this disclosure, the labeled baseline data may be stored in one or more databases. Data for multimodal analysis for content item semantic retrieval and identification and/or the like may be randomly assigned to a training dataset or a testing dataset. According to some aspects of this disclosure, the assignment of data to a training dataset or a testing dataset may not be completely random. In this case, one or more criteria may be used during the assignment, such as ensuring that similar text, similar textual connotations, similar textual semantics, similar lexical items, similar visual element/attributes, similar visual semantics, similar sonic attributes, similar tones/pitches, similar vocal patterns, similar rhythms/beats, similar ancillary items, dissimilar text, dissimilar textual connotations, dissimilar textual semantics, dissimilar lexical items, dissimilar visual element/attributes, dissimilar visual semantics, dissimilar sonic attributes, dissimilar tones/pitches, dissimilar vocal patterns, dissimilar rhythms/beats, dissimilar ancillary items, and/or the like may be used in each of the training and testing datasets. In general, any suitable method may be used to assign the data to the training or testing datasets.

According to some aspects of this disclosure, the multimodal content analysis and identification module 132 may train the machine learning-based classifier 330 by extracting a feature set from the labeled baseline data according to one or more feature selection techniques. According to some aspects of this disclosure, the multimodal content analysis and identification module 132 may further define the feature set obtained from the labeled baseline data by applying one or more feature selection techniques to the labeled baseline data in the one or more training datasets 310A-310N. The multimodal content analysis and identification module 132 may extract a feature set from the training datasets 310A-310N in a variety of ways. The multimodal content analysis and identification module 132 may perform feature extraction multiple times, each time using a different feature-extraction technique. In some instances, the feature sets generated using the different techniques may each be used to generate different machine learning-based classification models 340. According to some aspects of this disclosure, the feature set with the highest quality metrics may be selected for use in training. The multimodal content analysis and identification module 132 may use the feature set(s) to build one or more machine learning-based classification models 340A-340N that are configured to determine and/or predict associations between content items and natural language queries/requests for content items.

According to some aspects of this disclosure, the training datasets 310A-310N and/or the labeled baseline data may be analyzed to determine any dependencies, associations, and/or correlations between content items and natural language queries/requests for content items in the training datasets 310A-310N and/or the labeled baseline data. The term "feature," as used herein, may refer to any characteristic of an item of data that may be used to determine whether the item of data falls within one or more specific categories. For example, the features described herein may comprise indications of content items relevant to a query based on semantic text similarity, lexical similarities, attributes, and/or contextual items of image/depictions that indicate similarities in image data, sonic attributes, tones, pitches, vocal patterns, rhythms/beats, etc. that indicate similarities in audio content, ancillary information (e.g., indicating or related to a writer, director, producer, composer, artist, actor, summary, chapters, production, history, year, trailers, alternate versions, related content, applications, objects depicted in content items, object types, etc.). According to some aspects of this disclosure, features may include any other information pertaining or relating to content items, as well as queries/requests for content items.

According to some aspects of this disclosure, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times in the labeled baseline data may be considered candidate features. Any features appearing less than 2 times may be excluded from consideration as a feature. According to some aspects of this disclosure, a single feature selection rule may be applied to select features or multiple feature selection rules may be applied to select features. According to some aspects of this disclosure, the feature selection rules may be applied in a cascading fashion, with the feature selection rules being applied in a specific order and applied to the results of the previous rule. For example, the feature selection rule may be applied to the labeled baseline data to generate information (e.g., indications of similarities between content items and items requested/queried, etc.) that may be used for multimodal analysis for content item semantic retrieval and identification. A final list of candidate features may be analyzed according to additional features.

According to some aspects of this disclosure, the multimodal content analysis and identification module 132 may generate information (e.g., indications of similarities between content items and items requested/queried, etc.) that may be used for multimodal analysis for content item semantic retrieval and identification based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects of this disclosure, forward feature selection may be used to identify one or more candidate content items that relate to one or more queries for content items. Forward feature selection is an iterative method that begins with no feature in the machine learning model. In each iteration, the feature which best improves the model is added until the addition of a new variable does not improve the performance of the machine learning model. According to some aspects of this disclosure, backward elimination may be used to identify one or more candidate content items that relate to one or more queries for content items. Backward elimination is an iterative method that begins with all features in the machine learning model. In each iteration, the least significant feature is removed until no improvement is observed in the removal of features. According to some aspects of this disclosure, recursive feature elimination may be used to identify one or more candidate content items that relate to one or more queries for content items. Recursive feature elimination is a greedy optimization algorithm that aims to find the best-performing feature subset. Recursive feature elimination repeatedly creates models and keeps aside the best or the worst-performing feature at each iteration. Recursive feature elimination constructs the next model with the features remaining until all the features are exhausted. Recursive feature elimination then ranks the features based on the order of their elimination.

According to some aspects of this disclosure, one or more candidate content items that relate to one or more queries for content items may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients. According to some aspects of this disclosure, embedded methods may include textual data, image data, audio data, ancillary content item data, and/or the like being mapped to an embedding space to enable similarity between content items within a repository and content items requested and/or search/queried for to be identified.

According to some aspects of this disclosure, after multimodal content analysis and identification module 132 generates a feature set(s), the multimodal content analysis and identification module 132 may generate a machine learning-based predictive model 340 based on the feature set(s). A machine learning-based predictive model may refer to a complex mathematical model for data classification that is generated using machine-learning techniques. For example, this machine learning-based classifier may include a map of support vectors that represent boundary features. By way of example, boundary features may be selected from, and/or represent the highest-ranked features in, a feature set.

According to some aspects of this disclosure, the multimodal content analysis and identification module 132 may use the feature sets extracted from the training datasets 310A-310N and/or the labeled baseline data to build a machine learning-based classification model 340A-340N to determine and/or predict content items that relate to one or more queries for content items and/or the like. According to some aspects of this disclosure, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340. For example, according to some aspects of this disclosure, machine learning-based classification models 340A-340N may each classify a different modality of data. According to some aspects of this disclosure, the machine learning-based classifier 330 may also include each of the training datasets 310A-310N and/or each feature set extracted from the training datasets 310A-310N and/or extracted from the labeled baseline data. Although shown separately, multimodal content analysis and identification module 132 may include the machine learning-based classifier 330.

According to some aspects of this disclosure, the extracted features from requests and/or queries for content items, as well as content items available within a repository, catalog, database, via a service, and/or the like may be combined and/or implemented on classification models trained using a machine learning approach such as a siamese neural network (SNN); discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); other neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses textual data, image data, audio data, ancillary content item data, and/or the like to determine and/or predict content items that relate to one or more queries for content items.

According to some aspects of this disclosure, the textual data, image data, audio data, ancillary content item data, and/or the like, and the machine learning-based classifier 330 may be used to determine and/or predict content items that relate to one or more queries for content items for the test samples in the test dataset. For example, the result for each test sample may include a confidence level that corresponds to a likelihood or a probability that the corresponding test sample accurately determines and/or predicts content items that relate to one or more queries for content items. The confidence level may be a value between zero and one that represents a likelihood that the determined/predicted content items that relate to one or more queries for content items are consistent with computed values. Multiple confidence levels may be provided for each test sample and each candidate (approximated) content item that relates to one or more queries for content items. A top-performing candidate content item that relates to one or more queries for content items may be determined by comparing the result obtained for each test sample with a computed content item that relates to one or more queries for content items for each test sample. In general, the top-performing candidate content item that relates to one or more queries for content items will have results that closely match the computed content item that relates to one or more queries for content items. The top-performing candidate content items that best match one or more queries for content items may be used for multimodal analysis for content item semantic retrieval and identification operations.

Figure 4:
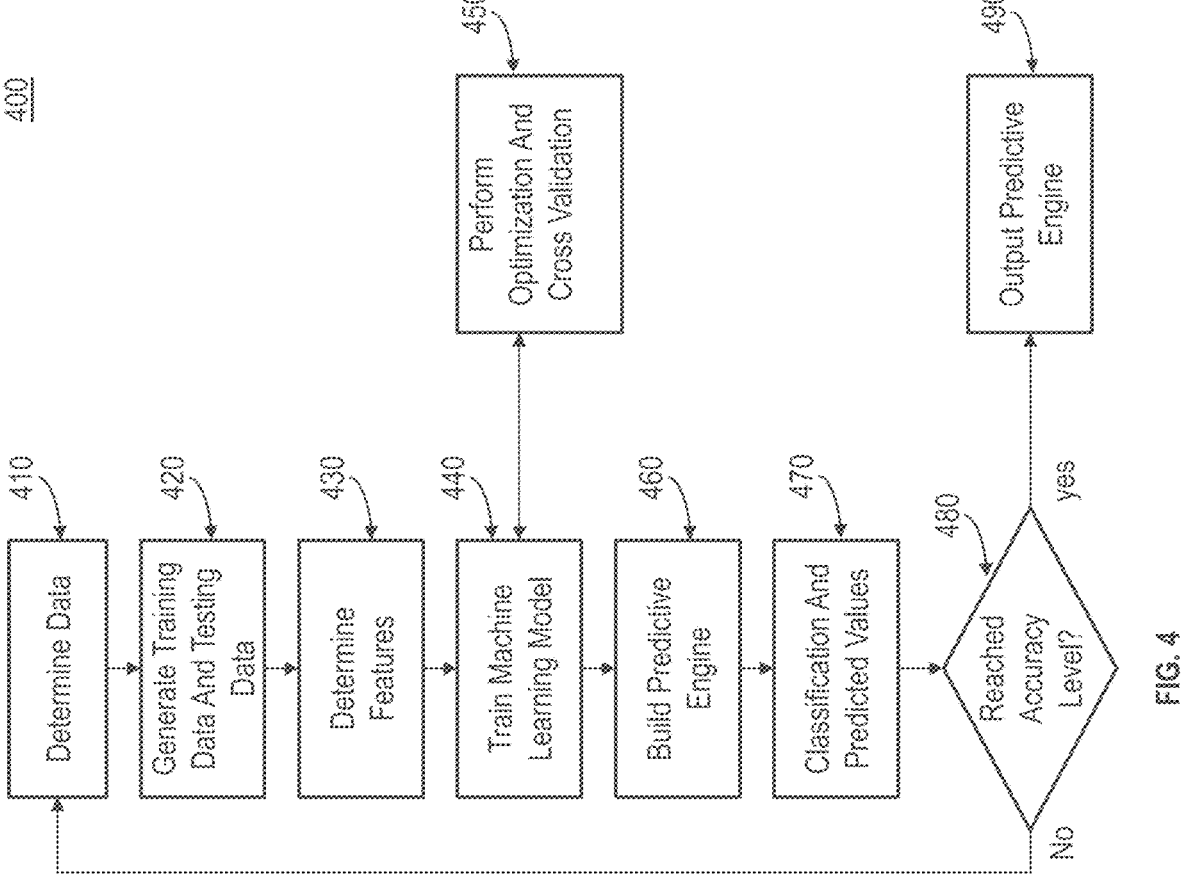
FIG. 4 illustrates a flowchart of an example training method for generating a machine learning classifier to classify data used for multimodal analysis for content item semantic retrieval and identification, according to some embodiments.

FIG. 4 is a flowchart illustrating an example training method 400. According to some aspects of this disclosure, method 400 configures machine learning classifier 330 for classification through a training process using the multimodal content analysis and identification module 132. The multimodal content analysis and identification module 132 can implement supervised, unsupervised, and/or semi-supervised (e.g., reinforcement-based) machine learning-based classification models 340. The method 400 shown in FIG. 4 is an example of a supervised learning method; variations of this example of training method are discussed below, however, other training methods can be analogously implemented to train unsupervised and/or semi-supervised machine learning (predictive) models. For example, multimodal content analysis and identification module 132 can train one or more predictive models to learn meaningful representations of the data (e.g., similarities between content items and requests/queries according to various modalities of data, etc.) without the need for labeled data. For example, according to some aspects of this disclosure, multimodal content analysis and identification module 132 may implement techniques such as auto-encoders, generative adversarial networks (GANs), or variational autoencoders (VAEs).

According to some aspects of this disclosure, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures.

In 410, the multimodal content analysis and identification module 132 determines (e.g., accesses, receives, retrieves, etc.) content item-related information. According to some aspects of this disclosure, the content item-related information may be textual data, image data, audio data, ancillary content item data, and/or the like to determine and/or predict content items that relate to one or more queries for content items. According to some aspects of this disclosure, content item-related information may be used to generate one or more datasets, each dataset associated with a different modality of data.

In 420, multimodal content analysis and identification module 132 generates a training dataset and a testing dataset. According to some aspects of this disclosure, the training dataset and the testing dataset may be generated by indicating content items that relate to one or more queries for content items. According to some aspects of this disclosure, the training dataset and the testing dataset may be generated by randomly assigning a content item that relates to a query to either the training dataset or the testing dataset. According to some aspects of this disclosure, the assignment of information indicative of content items that relate to one or more queries for content items as training or test samples may not be completely random. According to some aspects of this disclosure, only the labeled baseline data for a specific feature extracted from specific content item-related information may be used to generate the training dataset and the testing dataset. According to some aspects of this disclosure, a majority of the labeled baseline data extracted from content item-related information may be used to generate the training dataset. For example, 75% of the labeled baseline data for determining a content item that relates to one or more queries for content items extracted from content item-related information and/or related data may be used to generate the training dataset and 25% may be used to generate the testing dataset. Any method or technique may be used to create the training and testing datasets.

In 430, multimodal content analysis and identification module 132 determines (e.g., extract, select, etc.) one or more features that can be used by, for example, a classifier (e.g., a software model, a classification layer of a neural network, etc.) to label features extracted from a variety of content item-related information and/or related data. One or more features may comprise indications of content items that relate to one or more queries for content items. According to some aspects of this disclosure, the multimodal content analysis and identification module 132 may determine a set of training baseline features from the training dataset. Features of content and/or content item data may be determined by any method. In 440, multimodal content analysis and identification module 132 trains one or more machine learning models, for example, using the one or more features. According to some aspects of this disclosure, the machine learning models may be trained using supervised learning. According to some aspects of this disclosure, other machine learning techniques may be employed, including unsupervised learning and semi-supervised. The machine learning models trained in 340 may be selected based on different criteria (e.g., how close a predicted content item that relates to one or more queries for content items is to an actual content item that relates to one or more queries for content items, etc.) and/or data available in the training dataset. For example, machine learning classifiers can suffer from different degrees of bias. According to some aspects of this disclosure, more than one machine learning model can be trained.

In 450, multimodal content analysis and identification module 132 optimizes, improves, and/or cross-validates trained machine learning models. For example, data for training datasets and/or testing datasets may be updated and/or revised to include more labeled data indicating different content items that relate to one or more queries for content items.

In 460, multimodal content analysis and identification module 132 selects one or more machine learning models to build a predictive model (e.g., a machine learning classifier, a predictive engine, etc.). The predictive model may be evaluated using the testing dataset.

In 470, multimodal content analysis and identification module 132 executes the predictive model to analyze the testing dataset and generate classification values and/or predicted values.

In 480, multimodal content analysis and identification module 132 evaluates classification values and/or predicted values output by the predictive model to determine whether such values have achieved the desired accuracy level. Performance of the predictive model may be evaluated in a number of ways based on a number of true positives, false positives, true negatives, and/or false negatives classifications of the plurality of data points indicated by the predictive model. For example, the false positives of the predictive model may refer to the number of times the predictive model incorrectly predicted and/or determined a content item that relates to one or more queries for content items. Conversely, the false negatives of the predictive model may refer to the number of times the machine learning model predicted and/or determined a content item that relates to one or more queries for content items incorrectly, when in fact, the predicted and/or determined a content item that relates to one or more queries for content items matches an actual content item that relates to one or more queries for content items. True negatives and true positives may refer to the number of times the predictive model correctly predicted and/or determined a content item that relates to one or more queries for content items. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 490, multimodal content analysis and identification module 132 outputs the predictive model (and/or an output of the predictive model). For example, multimodal content analysis and identification module 132 may output the predictive model when such a desired accuracy level is reached. An output of the predictive model may end the training phase.

According to some aspects of this disclosure, when the desired accuracy level is not reached, in 490, multimodal content analysis and identification module 132 may perform a subsequent iteration of the training method 400 starting at 410 with variations such as, for example, considering a larger collection of content item-related information and/or related data.

Returning to FIG. 1, as described, responsive to a request and/or query, multimodal content analysis and identification module 132 may cause independently trained predictive models to concurrently run a first vector search on a first data type (e.g., image data for content items, etc.) and a second vector search on second data type (e.g., a text description for content items, etc.) using the request and/or query input as a search parameter to identify relevant content items and output a final search result (to the media device 106 and/or user 134 to the user) indicative of the relevant content items. According to some aspects of this disclosure, the result may be presented in the form of a list of content items that match the request and/or query input, ranked according to their normalized similarity scores, or as a single, aggregated result that combines information from both the second and first data types for identified content items.

According to some aspects of this disclosure, multimodal content analysis and identification module 132 may further refine a search result determined from the similarity scores generated by the first and second predictive models by incorporating search results determined from an exact-match and/or lexical search performed responsive to the request and/or query input.

According to some aspects of this disclosure, multimodal content analysis and identification module 132 may tokenize any text of a content item request and/or query input, removing stop words and punctuation, stemming or lemmatizing the words, and converting the words to lowercase. According to some aspects of this disclosure, for any image data of a content item request and/or query input, multimodal content analysis and identification module 132 may manipulate (e.g., convert to grayscale, color histograms, etc.) and/or resize the image data to a standard size.

According to some aspects of this disclosure, multimodal content analysis and identification module 132 may represent the content item request and/or query input and content items of a repository as vectors. For example, according to some aspects of this disclosure, multimodal content analysis and identification module 132 may convert preprocessed text to word, subwords, and/or sentences embeddings using techniques including, but not limited to, transformers models, word2vec and/or GloVe, or using bag-of-words representation including, but not limited to one-hot encoding or term frequency-inverse document frequency (TF-IDF). According to some aspects of this disclosure, for any image data, the vector representation may involve using feature extraction techniques, such as SIFT, HOG, ResNet, and/or Vision Transformers (VIT), to extract visual features from the image data.

According to some aspects of this disclosure, multimodal content analysis and identification module 132 may index the preprocessed and vector-represented query and content items. For example, multimodal content analysis and identification module 132 may use an inverted index, for efficient retrieval. According to some aspects of this disclosure, the inverted index may be a data structure that maps terms to textual data or image data in which they appear, allowing for fast retrieval of relevant content items based on the query.

According to some aspects of this disclosure, responsive to the request and/or query input, multimodal content analysis and identification module 132 may identify all content items that match the request and/or query exactly. According to some aspects of this disclosure, to identify all content items that match the request and/or query exactly, multimodal content analysis and identification module 132 may access and/or search the inverted index for terms and/or images that appear in the query and retrieve the corresponding content items.

According to some aspects of this disclosure, multimodal content analysis and identification module 132 may rank the retrieved content items based on their relevance to the query. According to some aspects of this disclosure, multimodal content analysis and identification module 132 may compute a similarity score between the query and each content item, such as cosine similarity or Jaccard similarity, and rank the content items based on the scores. According to some aspects of this disclosure, the ranking may also involve using predictive models of multimodal content analysis and identification module 132, such as a neural network or decision tree, to predict the relevance of each content item.

According to some aspects of this disclosure, content items identified using exact-match and/or lexical techniques may be combined with content items identified via semantic analysis to provide indication of the best and/or most relevant content items responsive to a request and/or query input.

Figure 5:
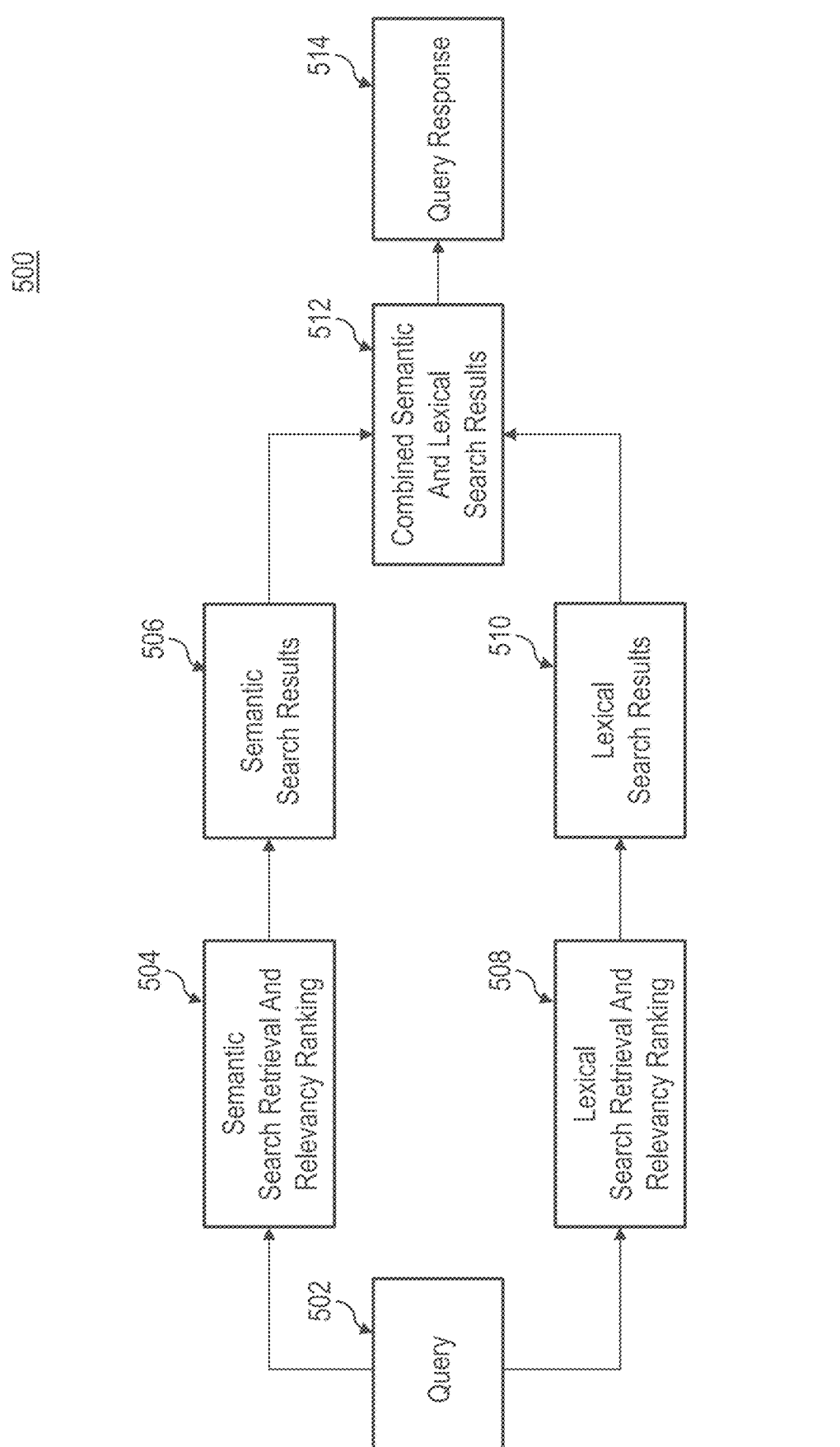
FIG. 5 shows an example block diagram of an example process for multimodal analysis for content item semantic retrieval and identification, according to some embodiments.

FIG. 5 shows an example block diagram of an example process 500 for multimodal analysis for content item semantic retrieval and identification, according to some embodiments. In 502, system server(s) 126 (e.g., multimodal content analysis and identification module 132, etc.) receives a query for content and/or a content item. For example, system server(s) 126 may receive a query such as "show me free action movies."

In 504, system server(s) 126 utilizes one or more predictive models to perform a semantic search of a repository, catalog, database, and/or the like according to one or more modalities of data to retrieve relevant content items. The resulting content items for each modality of data may be ranked according to how relevant they are to the query.

In 506, system server(s) 126 identifies semantic search results for the query. According to some aspects of this disclosure, the semantic search results may include content items with high-ranking normalized similarity scores for some modalities of data and/or each modality of data.

In 508, system server(s) 126 utilizes one or more predictive models to perform a lexical search of the repository, catalog, database, and/or the like to retrieve relevant content items. The resulting content items for each modality of data may be ranked according to how closely they match the lexical attributes of the query.

In 510, system server(s) 126 identifies lexical search results for the query. According to some aspects of this disclosure, the lexical search results may include content items with high-ranking relevancy scores for the lexical attributes of the query.

In 512, system server(s) 126 combines the lexical and semantic search results. According to some aspects of this disclosure, the combined search results may include content items with both high-ranking similarity scores and high-ranking relevancy scores.

In 514, system server(s) 126 outputs the combined search results responsive to the query. According to some aspects of this disclosure, the combined search results may be presented in the form of a list of content items that best match the query. According to some aspects of this disclosure, display device 108 may display the combined search results.

FIG. 6 shows a flowchart of an example method 600 for multimodal analysis for content item semantic retrieval and identification, according to some aspects of this disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to the aspects of those figures. A computer-based system (e.g., the multimedia environment 102, the system server(s) 126, etc.) may facilitate multimodal analysis for content item semantic retrieval and identification.

In 602, for each content item of a plurality of content items of a repository, system server(s) 126 generates a respective first similarity score. According to some aspects of this disclosure, system server(s) 126 generates the respective first similarity score for each content item of the plurality of content items based on a similarity between a first vector for an embedding indicative of a first data type generated from a query associated with the plurality of content items and a first respective vector for an embedding indicative of the first data type generated for the content item.

According to some aspects of this disclosure, for each content item of the plurality of content items, system server(s) 126 may generate the respective first similarity score by causing a first predictive model to generate the respective first similarity score responsive to the query. For example, the first predictive model may be trained to identify the similarity between the embedding indicative of the first data type generated from the query and the embedding indicative of the first data type generated for the content item.

In 604, system server(s) 126, for each content item of the plurality of content items, system server(s) 126 generates a respective second similarity score. According to some aspects of this disclosure, system server(s) 126 generates the respective second similarity score for each content item of the plurality of content items based on a similarity between a second vector for an embedding indicative of a second data type generated from the query and a second respective vector for an embedding indicative of the second data type generated for the content item.

According to some aspects of this disclosure, for each content item of the plurality of content items, system server(s) 126 may generate the respective second similarity score by causing a second predictive model to generate the respective second similarity score responsive to the query. For example, the second predictive model may be trained to identify the similarity between the embedding indicative of the second data type generated from the query and the embedding indicative of the second data type generated for the content item.

According to some aspects of this disclosure, system server(s) 126 causing the first predictive model to generate the respective first similarity score responsive to the query and causing the second predictive model to generate the respective second similarity score responsive to the query may include system server(s) 126 causing the first predictive model to generate the respective first similarity score and the second predictive model to generate the respective second similarity score concurrently. According to some aspects of this disclosure, the first data type may be different from the second data type. According to some aspects of this disclosure, the first data type and/or the second data type may include textual data, image data, audio data, ancillary content item data, and/or the like.

In 606, system server(s) 126, for each content item of the plurality of content items, system server(s) 126 normalizes the respective first similarity score and the respective second similarity score into a respective normalized similarity score. According to some aspects of this disclosure, normalizes the respective first similarity score and the respective second similarity score into the respective normalized similarity score based on a combination of the respective first similarity score and the respective second similarity score.

According to some aspects of this disclosure, for each content item of the plurality of content items, system server(s) 126 normalizing the respective first similarity score and the respective second similarity score into the respective normalized similarity score may include transforming the respective first similarity score to a respective common scale value based on a normal distribution of the respective first similarity score for each content item of the plurality of content items. According to some aspects of this disclosure, system server(s) 126 transforms the respective second similarity score to another respective common scale value based on a normal distribution of the respective second similarity score for each content item of the plurality of content items. According to some aspects of this disclosure, system server(s) 126 outputs the respective normalized similarity score based on a combination of the respective common scale value and the another respective common scale value.

In 608, system server(s) 126 identifies a set of content items of the plurality of content items with respective normalized similarity scores that satisfy a similarity score threshold. According to some aspects of this disclosure, system server(s) 126 identifies the set of content items of the plurality of content items with respective normalized similarity scores that satisfy the similarity score threshold based on the respective normalized similarity scores for the plurality of content items.

In 610, system server(s) 126 generates a respective mapping score for each content item of the plurality of content items. According to some aspects of this disclosure, system server(s) 126 generates the respective mapping score for each content item of the plurality of content items based on an amount of tokenized keywords from the query mapped to respective tokenized keywords from a respective description of each content item of the plurality of content items.

In 612, system server(s) 126 identifies a set of content items of the plurality of content items with respective mapping scores that satisfy a mapping score threshold.

In 614, system server(s) 126 outputs an indication of content items that are identified in the set of content items with respective normalized similarity scores that satisfy the similarity score threshold and identified in the set of content items with respective mapping scores that satisfy the mapping score threshold. According to some aspects of this disclosure, system server(s) 126 outputting the indication of the content items may include causing a user device from which the query is received to display the indication of the content items. According to some aspects of this disclosure, the indication of the content items may include indications of the content items arranged according to an order defined by user preferences associated with the user device.

Example Computer System

Figure 7:
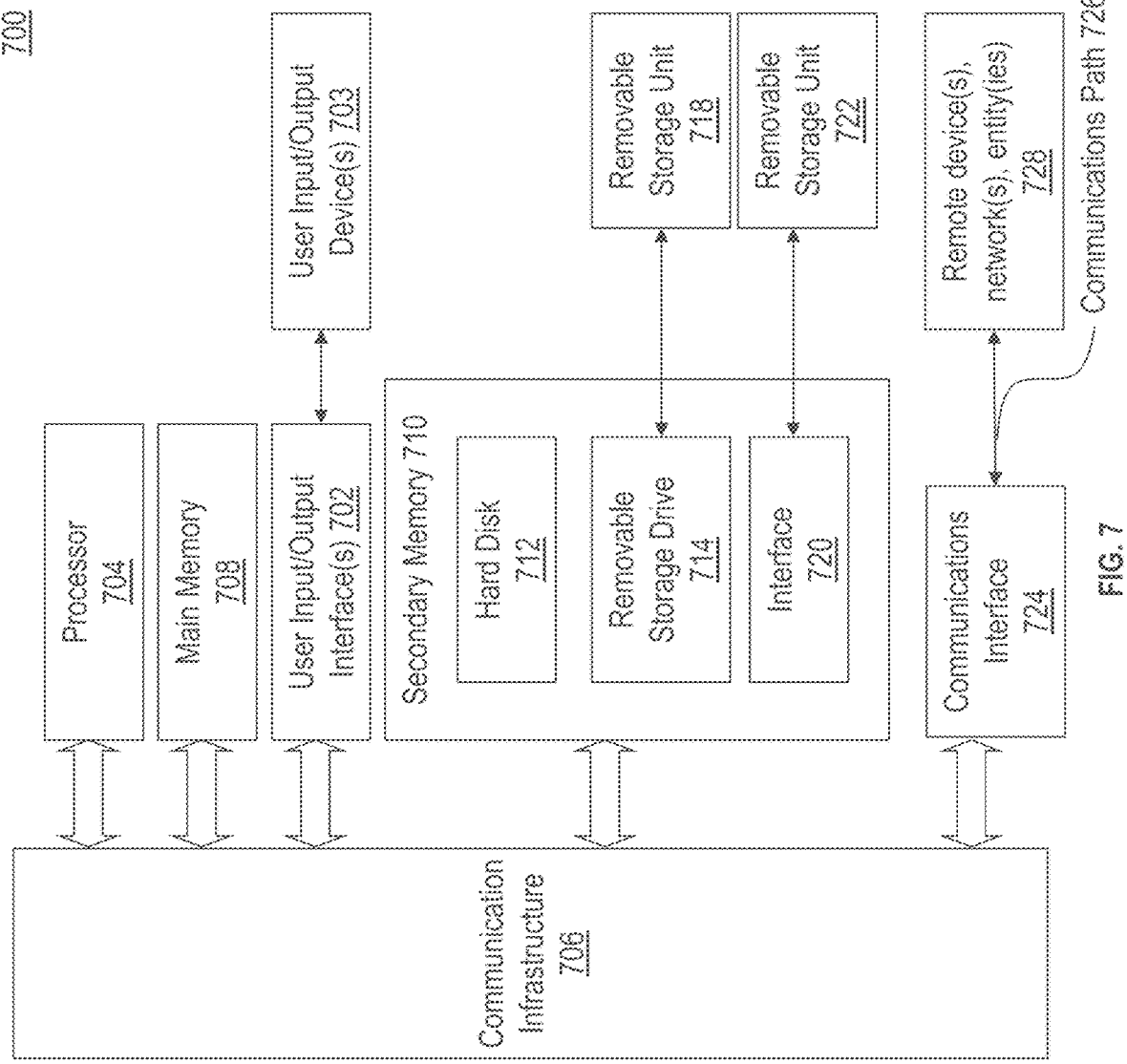
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
performing, with a first predictive model, a first vector search on an image data type portion of a multimodal query, input to a user interface of a media device providing a system for searching media content items, to generate a first similarity score indicating a similarity between the image data type portion and a content item, and concurrently performing, with a second predictive model, a second vector search on a text data type portion of the multimodal query to generate a second similarity score indicating a similarity between the text data type portion and the content item, wherein the first predictive model and the second predictive model are machine-learning based classifiers that are trained independently of each other, wherein the first predictive model is trained to identify a similarity between an embedding indicative of the image data type portion and an embedding indicative of data of an image data type generated for the content item, wherein the image data type portion is of the image data type, and wherein the second predictive model is trained to identify a similarity between an embedding indicative of the text data type portion and an embedding indicative of data of a text data type generated for the content item, wherein the text data type portion is of the text data type;
normalizing the first similarity score and the second similarity score;
combining the normalized first similarity score and the normalized second similarity score into a combined normalized similarity score;
generating, based on an amount of tokenized keywords from the multimodal query mapped to tokenized keywords from a description the content item, a mapping score for the content item; and
outputting an indication of the content item to the user interface based on the combined normalized similarity score satisfying a similarity score threshold and the mapping score satisfying a mapping score threshold.

2. The computer-implemented method of claim 1, wherein the normalizing the first similarity score and the second similarity score comprises:
transforming, based on a normal distribution of the first similarity score among each content item of a plurality of content items, the first similarity score to a common scale value; and
transforming, based on a normal distribution of the second similarity score among each content item of the plurality of content items, the second similarity score to another common scale value; and
wherein the combining into the combined normalized similarity score comprises outputting, based on a combination of the common scale value and the another common scale value, the combined normalized similarity score.

3. The computer-implemented method of claim 1, wherein the outputting the indication of the content item comprises causing the media device from which the multimodal query is received to display the indication of the content item.

4. The computer-implemented method of claim 3, wherein the indication of the content item is arranged according to a user preference associated with the media device.

5. A system, comprising:
one or more memories; and
at least one processor each coupled to at least one of the memories and configured to perform operations comprising:
performing, with a first predictive model, a first vector search on an image data type portion of a multimodal query, input to a user interface of a media device providing a system for searching media content items, to generate a first similarity score indicating a similarity between the image data type portion and a content item, and concurrently performing, with a second predictive model, a second vector search on a text data type portion of the multimodal query to generate a second similarity score indicating a similarity between the text data type portion and the content item, wherein the first predictive model and the second predictive model are machine-learning based classifiers that are trained independently of each other, wherein the first predictive model is trained to identify a similarity between an embedding indicative of the image data type portion and an embedding indicative of data of an image data type generated for the content item, wherein the image data type portion is of the image data type, and wherein the second predictive model is trained to identify a similarity between an embedding indicative of the text data type portion and an embedding indicative of data of a text data type generated for the content item, wherein the text data type portion is of the text data type;
normalizing the first similarity score and the second similarity score;
combining the normalized first similarity score and the normalized second similarity score into a combined normalized similarity score;
generating, based on an amount of tokenized keywords from the multimodal query mapped to tokenized keywords from a description the content item, a mapping score for the content item; and
outputting an indication of the content item to the user interface based on the combined normalized similarity score satisfying a similarity score threshold and the mapping score satisfying a mapping score threshold.

6. The system of claim 5, wherein the normalizing the first similarity score and the second similarity score comprises:

transforming, based on a normal distribution of the first similarity score among each content item of a plurality of content items, the first similarity score to a common scale value; and transforming, based on a normal distribution of the second similarity score among each content item of the plurality of content items, the second similarity score to another common scale value; and wherein the combining normalized similarity score comprises outputting, based on a combination of the common scale value and the another common scale value, the combined normalized similarity score.

7. The system of claim 5, wherein the outputting the indication of the content item comprises causing the media device from which the multimodal query is received to display the indication of the content item.

8. The system of claim 7, wherein the indication of the content item is arranged according to a user preference associated with the media device.

9. A non-transitory computer-readable medium having instructions stored thereon that, when executed by at least one computing device, cause the at least one computing device to perform operations comprising:

performing, with a first predictive model, a first vector search on an image data type portion of a multimodal query, input to a user interface of a media device providing a system for searching media content items, to generate a first similarity score indicating a similarity between the image data type portion and a content item, and concurrently performing, with a second predictive model, a second vector search on a text data type portion of the multimodal query to generate a second similarity score indicating a similarity between the text data type portion and the content item, wherein the first predictive model and the second predictive model are machine-learning based classifiers that are trained independently of each other, wherein the first predictive model is trained to identify a similarity between an embedding indicative of the image data type portion and an embedding indicative of data of an image data type generated for the content item, wherein the image data type portion is of the image data type, and wherein the second predictive model is trained to identify a similarity between an embedding indicative of the text data type portion and an embedding indicative of data of a text data type generated for the content item, wherein the text data type portion is of the text data type;

normalizing the first similarity score and the second similarity score;

combining the normalized first similarity score and the normalized second similarity score into a combined normalized similarity score;

generating, based on an amount of tokenized keywords from the multimodal query mapped to tokenized keywords from a description the content item, a mapping score for the content item; and outputting an indication of the content item to the user interface based on the combined normalized similarity score satisfying a similarity score threshold and the mapping score satisfying a mapping score threshold.

10. The non-transitory computer-readable medium of claim 9, wherein the normalizing the first similarity score and the second similarity score comprises:

transforming, based on a normal distribution of the first similarity score among each content item of a plurality of content items, the first similarity score to a common scale value; and transforming, based on a normal distribution of the second similarity score among each content item of the plurality of content items, the second similarity score to another common scale value; and wherein the combining into the combined normalized similarity score comprises outputting, based on a combination of the common scale value and the another common scale value, the combined normalized similarity score.

11. The non-transitory computer-readable medium of claim 9, wherein the outputting the indication of the content item comprises causing the media device from which the multimodal query is received to display the indication of the content item.

12. The non-transitory computer-readable medium of claim 11, wherein the indication of the content item is arranged according to a user preference associated with the media device.

* * * * *